June 7, 1955  I. LUNDQUIST  2,710,405

CARRIAGE CUSHIONING MEANS FOR CALCULATING MACHINES

Filed Jan. 14, 1954

INVENTOR
INGEMAR LUNDQUIST
BY George V. Hall
ATTORNEY

United States Patent Office 2,710,405
Patented June 7, 1955

2,710,405

CARRIAGE CUSHIONING MEANS FOR CALCULATING MACHINES

Ingemar Lundquist, East Orange, N. J., assignor to Monroe Calculating Machine Company, Orange, N. J., a corporation of Delaware Application January 14, 1954, Serial No. 403,955

5 Claims. (Cl. 235—63)

The invention relates to carriage shifting mechanism for calculating machines and more particularly to improvements in carriage shifting mechanism of the type disclosed in Patent No. 2,473,471 issued on June 14, 1949, to Herman Gang. This type of shift mechanism is adapted to raise a pivotally mounted carriage to disengage the register transmission gears in the carriage from those in the fixed frame of the machine to thereby permit denominational shift of the carriage. The arrangement is such that the carriage is raised during the first half step of a denominational shifting operation, and during the second half step of the operation, gravity assisted by a pair of locators moves the carriage downwardly to reengage the register transmission gears. Normally, the downward movement of the carriage would be accelerated and considerable objectionable noise would result from sudden arrest of the movement at the completion of the shifting operation. To minimize this noise, the aforenoted patent discloses a cushioning arrangement comprising a governor which retards the downward movement of the carriage. The governor, however, is effective throughout substantially the entire downward movement of the carriage and this has been found to slow the shifting operation.

The present invention provides carriage cushioning means which is substantially ineffective to control the downward movement of the carriage until near the end of such movement in a shifting operation effected by mechanism of the type referred to above. The devices of the invention prevent acceleration near the end of the downward movement of the carriage and therefore do not substantially reduce the speed of the shifting operation while appreciably reducing the noise attendant therewith. The invention, however, will best be understood from the following description with reference to the accompanying drawings in which:

Figure 1:
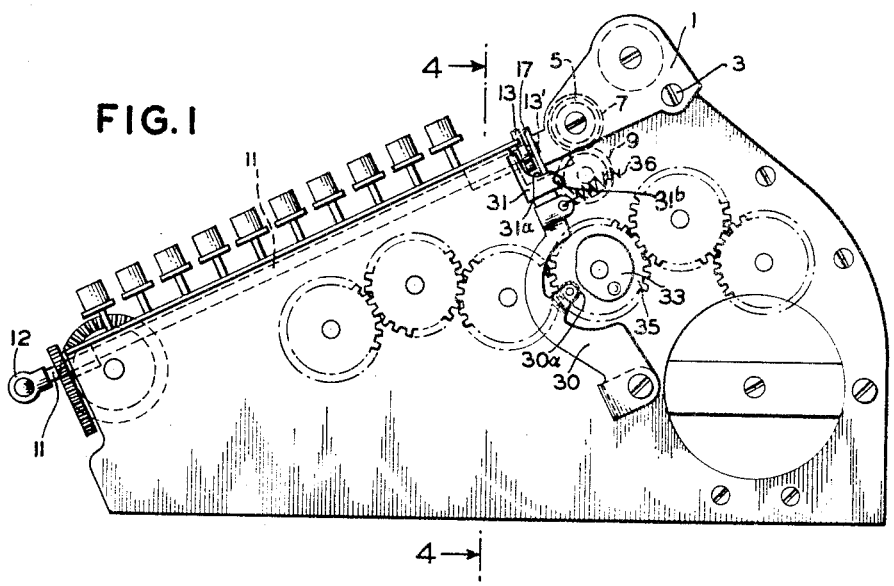
Fig. 1 is a side view of a calculating machine embodying the invention with the parts in normal full cycle position.
Figure 3:
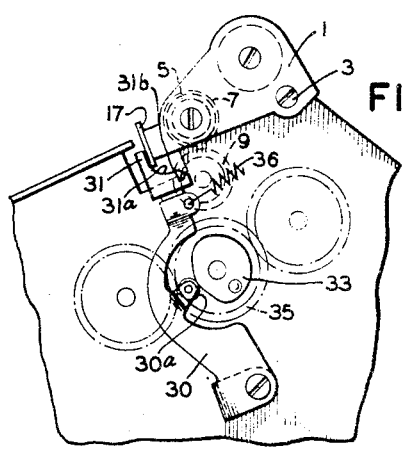
Fig. 3 is a fragmentary detail view showing the position of the dampening devices when the carriage is raised in a shifting operation.

The carriage 1 (Figs. 1 and 4) is provided at its rear with a shaft 3 extending between the end plates thereof and slidably and rotatably mounted in the side frames of the machine. The carriage is therefore adapted to be raised at its forward edge as shown in Fig. 3 to disengage the gears 5 of the wheels 7 of the product dividend register from the transmission gears 9 so that the carriage may be longitudinally shifted. The transmission gears 9 which are mounted in the body of the machine are driven by digital and tens carry actuating mechanism (not shown). The actuating mechanism is driven by a gear train including a transmission gear 35 and is of the well known Baldwin type which has an idle phase of operation at the beginning of each registering cycle.

As fully disclosed in the aforenoted patent, carriage 1 is denominationally shifted upon a 180° turn of a shaft 11 which is journaled in suitable bearings beneath the keyboard of the machine. Shaft 11 may be manually rotated by a handle 12 (Fig. 1) or may be rotated automatically as described in the above-noted patent to which reference is made for such operation.

The means whereby carriage 1 is shifted upon rotation of shaft 11 includes a double arm crank 13 (Figs. 1 and 4) mounted at the rear end of the shaft and provided with a pair of diametrically disposed rollers 13'. The rollers 13' are equidistantly spaced from shaft 11, and when the carriage is in its normal lowered position, the rollers lie in a horizontal plane (Fig. 4) and respectively engage a scalloped recess 15 in the lower edge of a rail 17 at the forward edge of the carriage. Rollers 13', therefore, act to support the forward edge of the carriage when it is in its normal lowered position.

Crank 13 is rotated a half turn clockwise (Fig. 4) to effect a right shift of one order and counterclockwise to effect a left shift. When crank arm 13 is rotated clockwise, for example, the leftmost roller 13' in engagement with a recess 15 will, through the first 90° of travel, raise the carriage pivotally and at the same time move it toward the right. During this movement, the rightmost roller 13' of crank arm 13 will be moved downwardly from engagement with its recess in rail 17 as the forward edge to the carriage is moved upwardly. When crank 13 has passed the 90° point, no further application of power to shaft 11 is necessary to complete the shift, as the weight of the carriage assisted by a pair of locators (not shown) will urge said crank further in clockwise direction to complete the half turn as the carriage moves downwardly and to the right into shifted position as fully described in the aforenoted patent.

Figure 4:
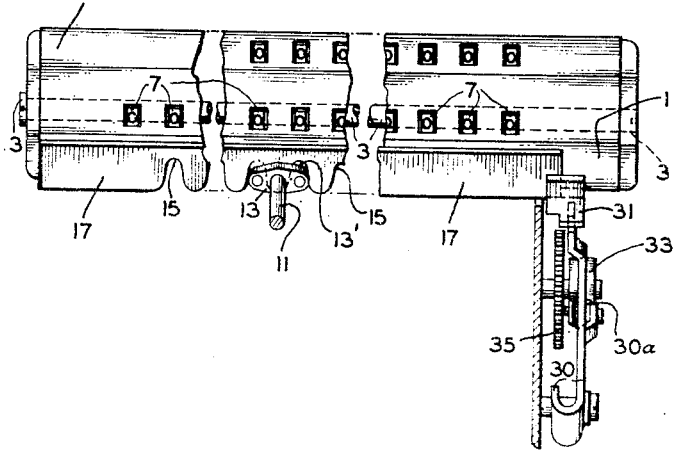
Fig. 4 is a fragmentary front view of the carriage shifting devices.

The cushioning means of the present invention for controlling downward movement of the carriage comprises an arm 30 pivotally mounted on the right side frame of the machine and biased in clockwise direction by a spring 36. A dampener comprising a nylon block 31 is mounted on the upper free end of arm 30 and on the side thereof facing carriage rail 17 is an arcuate cam face 31a adapted for engagement with said rail. As shown in Fig. 4 the upper end of arm 30 is offset toward the left so that cam face 31a will be in position for engagement with rail 17 in any shifted position of the carriage. Arcuate face 31a extends downwardly and inwardly from a plane substantially parallel with the plane of the front face of the rail to a plane substantially parallel with that of the lower edge of the rail. This provides that, in effect, the cam face extends downwardly and radially inward from a path concentric with the pivotal path of movement of the carriage to a plane radially intersecting said path. A cam 33 is fixed for rotation with actuator transmission gear 35 and a cam follower comprising a roller 30a mounted on arm 30 is adapted for engagement therewith.

Figure 2:
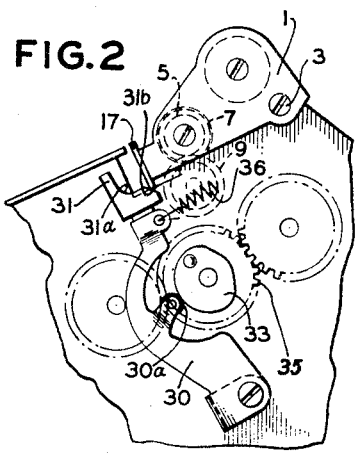
Fig. 2 is a fragmentary detail view showing the position of the dampening devices when the registering mechanism is cycled.

When the machine is at rest in normal full cycle position (Fig. 1) the lower edge of carriage rail 17 rests upon the portion of cam face 31a which extends substantially in the same plane therewith. When the parts are in this position the forward edge of carriage 1 is slightly raised thereby moving the actuator transmission gears slightly from full mesh position. It will be noted that when the parts are in full cycle position roller 30a is in position to engage the lower portion of cam 33 if arm 30 were permitted clockwise movement. However, when the machine is cycled, and before the digital actuator gears are effective, the high portion of cam 33 will engage roller 30a thereby rocking arm 30 to the position shown in Fig. 2.

As arm 30 is rocked to this position, cam face 31a will be removed from engagement with the lower edge of rail 17 which thereupon will engage an inclined face 31b on the rear upper edge of block 31. This will permit a slight downward movement of carriage 1 to thereby fully engage the actuator transmission gears.

As heretofore noted the carriage may be shifted by manual operation of shaft 11 or alternatively by automatic operation of division control mechanism. When registration is terminated in the operation of the division program devices, the actuating mechanism overruns beyond full cycle position and then moves reversibly to full cycle position. The automatic carriage shift devices are operated as an incident to the overrun of the actuating mechanism as disclosed in the aforenoted Patent No. 2,473,471. This movement beyond full cycle position, however, is not sufficient to move the dwell of the lower portion of cam 33 from position for engagement by cam follower 30a. Therefore, when the forward edge of carriage 1 is raised in the shifting operation, as shown in Fig. 3, arm 30 will be permitted clockwise movement by spring 36 to engage roller 30a with the low portion of cam 33. Upon this clockwise movement of arm 30 the portion of cam face 31a, which is substantially parallel with the front face of carriage rail 17, will be moved into engagement with the lower edge of the rail. As the carriage moves downwardly from the position shown in Fig. 3 in the second half of the shifting operation, the lower edge of rail 17 engaging cam face 31a will cam arm 30 counterclockwise against the tension of spring 36. It will be noted that at the beginning of the downward movement of the carriage very little resistance will be offered to this movement because at this time the portion of the cam face 31a engaging the lower edge of rail 17 is in a plane approaching a right angle to the lower edge of the rail. However, as the carriage is lowered, the engaged cam face 31a progressively approaches the plane of the lower edge of rail 17. Therefore, the camming effect exerted on face 31a is progressively decreased as arm 30 is rocked counterclockwise and, therefore, a force resisting downward movement of the carriage is progressively increased to check and decelerate said downward movement as the carriage is brought to rest in the position shown in Fig. 1. From the foregoing description it will be seen that the noise attendant with the shifting operation is markedly decreased by deceleration of the downward movement of the carriage and, furthermore, the noise is minimized by the nylon composition of dampener block 31.

When the carriage is shifted manually by operation of handle 12 the registering mechanisms will be in full cycle position and the operation will be the same as described in connection with the automatic shifting operation.

It will be apparent that changes may be made in the contour of cam face 31a and of inclined face 31b of dampener block 31 without departing from the principle of operation. It will be understood, therefore, that the invention is to be limited in so far as necessitated by the scope of the appended claims.

I claim:

1. In a calculating machine having a carriage pivotally and slidably mounted on the fixed frame of the machine, and means for denominationally shifting said carriage including means for raising said carriage pivotally and then permitting said carriage to be restored downwardly; means for controlling downward movement of said carriage, comprising an adjustable dampener having an arcuate cam face extending downwardly and radially inward from a path substantially concentric with the downward path of movement of said carriage to a plane substantially radially intersecting said downward path, and spring means operable upon raising of said carriage to adjust said dampener to engage the portion of said cam face which is in said concentric path with said carriage and to position the portion of said cam face which extends in said radial plane below said carriage.

2. In a calculating machine having a carriage pivotally and slidably mounted at its rear on the fixed frame of the machine, and means for denominationally shifting said carriage including means for raising said carriage pivotally and then permitting said carriage to be restored downwardly; means for controlling downward movement of said carriage, comprising an adjustable dampener to the front of said carriage having an arcuate cam face extending downwardly and radially inward from a path substantially concentric with the downward path of movement of said carriage to a plane substantially radially intersecting said downward path, and spring means operable upon raising of said carriage to adjust said dampener inwardly toward said carriage to engage the portion of said cam face which is in said concentric path with the lower front edge of said carriage and to position the portion of said cam face which extends in said radial plane below said lower front edge.

3. The invention according to claim 2 characterized by provision of means operable subsequent to a carriage shifting operation to adjust said dampener to remove its cam face from engagement with said lower carriage edge.

4. The invention according to claim 3 characterized by provision of a surface on said dampener inclined downwardly from the inward edge of its arcuate cam face and adapted for engagement by said lower carriage edge upon adjustment of said dampener to disengage said cam face from said edge.

5. In a calculating machine having a carriage pivotally and slidably mounted at its rear on the fixed frame of the machine, and means for denominationally shifting said carriage including means for raising said carriage pivotally and then permitting said carriage to be restored downwardly; means for controlling downward movement of said carriage, comprising a pivotally mounted arm having an upper free end to the front of said carriage, a dampening member mounted on the upper end of said arm and having an arcuate cam face extending downwardly and radially inward from a path substantially concentric with the downward path of movement of said carriage to a plane substantially radially intersecting said downward path, and spring means operable upon raising of said carriage to rock said arm to engage the portion of said cam face which is in said concentric path with the lower front edge of said carriage and to position the portion of said cam face which extends in said radial plane below said lower front edge.

References Cited in the file of this patent

UNITED STATES PATENTS

| | | |
|---|---|---|
| 1,384,592 | Britten, Jr. | July 12, 1921 |
| 2,377,767 | Dustin et al. | June 5, 1945 |
| 2,473,471 | Gang | June 14, 1949 |
| 2,527,990 | Gang | Oct. 31, 1950 |

FOREIGN PATENTS

| | | |
|---|---|---|
| 434,145 | Germany | Sept. 22, 1926 |